United States Patent
Imoto

(10) Patent No.: US 7,718,313 B2
(45) Date of Patent: May 18, 2010

(54) ANODE MATERIAL AND BATTERY USING THE SAME

(75) Inventor: Hiroshi Imoto, Fukushima (JP)

(73) Assignee: Sony Corporation, Tokyo (JP)

( * ) Notice: Subject to any disclaimer, the term of this patent is extended or adjusted under 35 U.S.C. 154(b) by 1012 days.

(21) Appl. No.: 10/871,437

(22) Filed: Jun. 18, 2004

(65) Prior Publication Data

US 2004/0265691 A1    Dec. 30, 2004

(30) Foreign Application Priority Data

Jun. 23, 2003   (JP) .......................... P2003-177886

(51) Int. Cl.
*H01M 4/38* (2006.01)
(52) U.S. Cl. .................. 429/221; 429/218.1; 429/220; 423/324
(58) Field of Classification Search .................. None
See application file for complete search history.

(56) References Cited

U.S. PATENT DOCUMENTS

| | | | |
|---|---|---|---|
| 5,554,458 A | * | 9/1996 | Noda et al. .................. 429/326 |
| 7,132,197 B2 | * | 11/2006 | Miyaki .................... 429/218.1 |
| 2003/0134198 A1 | | 7/2003 | Sawa et al. |

FOREIGN PATENT DOCUMENTS

| | | |
|---|---|---|
| EP | 1 039 568 A1 | 9/2000 |
| JP | 06-325765 | 11/1994 |
| JP | 07-230800 | 8/1995 |
| JP | 2001297757 | 10/2001 |
| JP | 2003036840 | 10/2001 |
| JP | 2001307723 | 11/2001 |
| JP | 2002373647 | 12/2002 |
| WO | 01/91224 A1 | 11/2001 |

\* cited by examiner

*Primary Examiner*—John S Maples
(74) *Attorney, Agent, or Firm*—K&L Gates LLP

(57) ABSTRACT

An anode material capable of improving cycle characteristics, and a battery using the anode material are provided. A disk-shaped cathode contained in a package can and a disk-shaped anode contained in a package cup are laminated with a separator in between. The anode includes an alloy or a compound including iron in addition to at least either tin or silicon. The ratio of iron in the alloy or the compound is preferably about 15% by mass or less. Moreover, it is preferable that the alloy or the compound further includes chromium in an amount of less than 1500 ppm by mass.

22 Claims, 1 Drawing Sheet

ANODE MATERIAL AND BATTERY USING THE SAME

CROSS REFERENCES TO RELATED APPLICATIONS

This application claims priority to Japanese Patent Application No. P2003-177886 filed on Jun. 23, 2003, the disclosure of which is incorporated by reference herein.

BACKGROUND OF THE INVENTION

The present invention relates to an anode material made of an alloy or a compound including at least either tin (Sn) or silicon (Si), and a battery using the anode material.

In recent years, as mobile devices have higher performance and more functions, secondary batteries with higher capacity used as power sources of the mobile devices have been desired. A secondary battery which meets the requirement is a lithium-ion secondary battery. However, in a currently widely used lithium-ion secondary battery using lithium cobalt oxide as a cathode and graphite as an anode, its battery capacity is in a saturation state, so it is extremely difficult to significantly increase the capacity.

Under the circumstances, as an anode material capable of achieving a higher capacity, tin and silicon which form an alloy with lithium, and an alloy thereof have been widely researched. However, they have the following problem. When they are bonded with and dissociated from lithium (Li) during charge and discharge, they are expanded and shrunk, so they are cracked into small pieces whenever charge and discharge are repeated. Thereby, they have poor cycle characteristics. Therefore, attempts to prevent the expansion of the alloy during charge by adding an element which does not form an intermetallic compound with lithium have been made (for example, refer to Japanese Unexamined Patent Application Publication Nos. Hei 6-325765 and Hei 7-230800).

However, there is a problem that an improvement in the cycle characteristics is not sufficient even if the element is added.

SUMMARY OF THE INVENTION

The present invention relates to an anode material made of an alloy or a compound including at least either tin (Sn) or silicon (Si), and a battery using the anode material.

The present invention provides an anode material capable of improving cycle characteristics, and a battery using the anode material.

An anode material according to an embodiment of the invention includes an alloy or a compound including iron (Fe) in addition to at least either tin or silicon.

A battery according to an embodiment of the invention includes a cathode, an anode and an electrolyte, wherein the anode includes an alloy or a compound including iron in addition to at least either tin or silicon.

In the anode material according to an embodiment of the invention and the battery according to an embodiment of the invention, the alloy or the compound including at least either tin or silicon further includes iron, so superior cycle characteristics can be obtained.

Additional features and advantages of the present invention are described in, and will be apparent from, the following Detailed Description of the Invention and the figures.

DETAILED DESCRIPTION OF THE INVENTION

Figure 1:
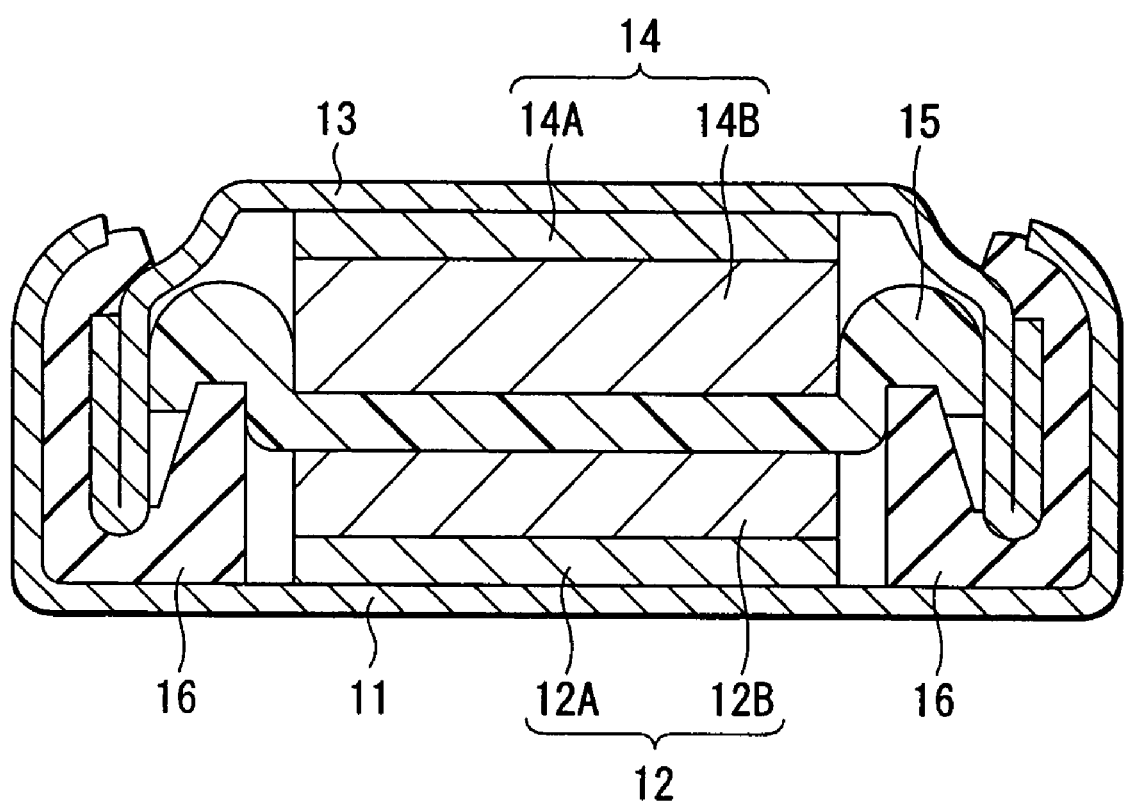
FIG. 1 is a sectional view of a secondary battery according to an embodiment of the invention.

The present invention relates to an anode material made of an alloy or a compound including at least either tin (Sn) or silicon (Si), and a battery using the anode material.

A preferred embodiment of the present invention will be described in more detail below referring to the accompanying drawing.

An anode material according to an embodiment of the invention includes, for example, a powder of an alloy including at least either tin or silicon, or a powder of a compound including at least either tin or silicon, and at least one kind such as nonmetal elements that include oxygen (O), sulfur (S) and the like. As used herewith, the term alloy means not only an alloy including two or more kinds of metal elements but also an alloy including one or more kinds of metal elements and one or more kinds of metalloid elements. As the composition of the alloy, a solid solution, a eutectic (eutectic mixture), an intermetallic compound or the coexistence of two or more kinds thereof ca be utilized.

The powder of the alloy or the compound functions as an anode active material, and the powder includes tin or silicon so as to insert and extract lithium or the like which is an electrode reactive species, thereby a higher capacity can be obtained. For example, in the case of an alloy including tin, the ratio of tin is preferably about 40% by mass or over, and in the case of an alloy including silicon, the ratio of silicon is preferably about 10% by mass or over. When the ratio of tin or silicon is lower than the above value, a higher capacity cannot be obtained.

Moreover, the powder of the alloy or the compound includes iron, thereby cycle characteristics can be improved. The ratio of iron is preferably about 15% by mass or less, more preferably about 10% by mass or less, and more preferably about 8% by mass or less. When the ratio of iron is too high, the capacity may decline. Further, the ratio of iron is preferably about 0.1% by mass or over. When the ratio of iron is lower, the cycle characteristics cannot be sufficiently improved.

Moreover, the powder of the alloy or the compound preferably includes chromium (Cr) in addition to iron. When chromium is further included, the cycle characteristics can be further improved. The ratio of chromium is less than about 1500 ppm by mass, more preferably about 1000 ppm by mass or less, and more preferably about 10 ppm by mass or over, because within the range, the cycle characteristics can be further improved.

The powder of the alloy and the compound may further include any element other than the above-described elements. As the element, for example, metal elements which do not form an intermetallic compound with lithium are preferable, and among them, at least either cobalt (Co) or copper (Cu) is preferable, because the cycle characteristics can be further improved. In addition, between the alloy and a compound including a nonmetal element, the alloy is preferable, because the alloy can obtain a higher capacity.

A method of forming the powder of the alloy or the compound is not limited, and, for example, various atomization methods such as gas atomization and water atomization, mechanically forming methods such as mechanical alloying, mechanical milling and a ball mill, vapor deposition and the like, and some of these forming methods may be combined.

For example, such an anode material is used in a battery as follows.

FIG. 1 shows a sectional view of a secondary battery using the anode material according to the embodiment. The secondary battery is a so-called coin type, and includes a laminate including a disk-shaped cathode 12 contained in a package can 11 and a disk-shaped anode 14 contained in a package cup 13 with a separator 15 in between. Edge portions of the package can 11 and the package cup 13 are sealed through caulking by an insulating gasket 16. The package can 11 and the package cup 13 are made of, for example, metal such as stainless foil, aluminum or the like.

The cathode 12 includes, for example, a cathode current collector 12A and a cathode mixture layer 12B disposed on the cathode current collector 12A. The cathode current collector 12A is made of, for example, metal foil such as aluminum foil, nickel foil or stainless foil. The cathode mixture layer 12B includes, for example, one kind or two or more kinds of cathode materials capable of inserting and extracting lithium, and if necessary, the cathode mixture layer 12B may include an electrical conductor and a binder. Examples of the cathode materials capable of inserting and extracting lithium include metal sulfide and metal oxide not including lithium such as titanium sulfide ($TiS_2$), molybdenum sulfide ($MoS_2$), niobium selenide ($NbSe_2$) and vanadium oxide ($V_2O_5$), lithium complex oxide including lithium, and high molecular weight compounds such as polyacetylene, polypyrrole and the like.

Among them, lithium complex oxide is preferable, because a higher voltage and a higher energy density can be obtained. As such lithium complex oxide, for example, lithium complex oxide represented by a chemical formula $Li_xMIO_2$, $Li_yMIIPO_4$ or the like can be utilized. In the formulas, MI and MII each represent one or more kinds of transition metal, and specifically MI and MII each preferably include at least one kind, such as cobalt, nickel, manganese and the like. The values of x and y depend upon charge-discharge conditions of the battery, and is generally within a range of $0.05 \leq x \leq 1.10$ and $0.05 \leq y \leq 1.10$. Specific examples of the lithium complex oxide represented by the chemical formula $Li_xMIO_2$ include $LiCoO_2$, $LiNiO_2$, $LiNi_zCo_{1-z}O_2$ $(0<z<1)$ and $LiMn_2O_4$.

The anode 14 includes, for example, an anode current collector 14A and an anode mixture layer 14B disposed on the anode current collector 14A. The anode current collector 14A is made of, for example, metal foil such as copper foil, nickel foil, stainless foil or the like.

The anode mixture layer 14B includes the anode material according to the embodiment, and if necessary, a binder such as polyvinylidene fluoride. Moreover, in addition to the anode material according to the embodiment, any other anode active material or any other material such as an electrical conductor may be included. As the anode active material, a carbonaceous material capable of inserting and extracting lithium, metal oxide, or a high molecular weight compound can be used. Examples of the carbonaceous material include non-graphitizable carbon, artificial graphite, natural graphite, kinds of pyrolytic carbon, kinds of coke, kinds of graphite, kinds of glass-like carbon, a sintered high molecular weight organic compound body, carbon fiber, activated carbon, kinds of carbon black and the like. Among them, kinds of coke include pitch coke, needle coke, petroleum coke and the like, and the sintered high molecular weight organic compound includes a high molecular weight compound such as a phenolic resin or a furan resin which is carbonized through firing at an adequate temperature. Moreover, as the metal oxide, tin oxide represented by a chemical formula $SnO_a$ ($0.5<a<2$) can be used, and as the high molecular weight compound, polyacetylene, polyparaphenylene, polythiophene or the like can be utilized.

The separator 15 isolates between the cathode 12 and the anode 14 so as to pass lithium ions through while preventing a short circuit of a current due to contact between the cathode 12 and the anode 14. The separator 15 is made of, for example, a porous film made of a synthetic resin such as polytetrafluoroethylene, polypropylene and polyethylene, or a porous film made of an inorganic material such as nonwoven fabric made of ceramic, and may have a structure in which two or more kinds, these porous films are laminated.

The separator 15 is impregnated with an electrolyte solution which is a liquid electrolyte. The electrolyte solution includes a solvent and a lithium salt which is an electrolyte salt dissolved in the solvent. Examples of the solvent include propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like. One kind or a mixture of two or more kinds, such as the solvents may be used.

Examples of the lithium salt include lithium hexafluorophosphate ($LiPF_6$), lithium perchlorate ($LiClO_4$), lithium hexafluoroarsenate ($LiAsF_6$), tetrafluoroborate lithium ($LiBF_4$), lithium trifluoromethane sulfonate ($LiCF_3SO_3$), lithium bis(trifluoromethane-sulfonyl)imide ($LiN(CF_3SO_2)_2$) and the like. One kind or a mixture of two or more kinds selected from the lithium salts may be used.

When the secondary battery is charged, for example, lithium ions are extracted from the cathode 12, and are inserted into the anode 14 through the electrolyte solution. When the secondary battery is discharged, for example, lithium ions are extracted from the anode 14, and are inserted into the cathode 12 through the electrolyte solution. Herein, the anode 14 includes the powder of the alloy or the compound including iron in addition to at least either tin or silicon, so superior cycle characteristics can be obtained.

The secondary battery can be manufactured through the following steps, for example.

At first, for example, the cathode material, and, if necessary, the electrical conductor and the binder are mixed, and the mixture is dispersed into a dispersion medium such as N-methyl pyrrolidone to form cathode slurry. Next, after the cathode slurry is applied to the cathode current collector 12A and is dried, the cathode slurry is compression molded to form the cathode mixture layer 12B, thereby the cathode 12 is formed.

Moreover, for example, the anode material according to the embodiment, and, if necessary, the binder are mixed, and the mixture is dispersed into a dispersion medium such as N-methyl pyrrolidone to form anode slurry. Next, after the anode slurry is applied to the anode current collector 14A and is dried, the anode slurry is compression molded to form the anode mixture layer 14B, thereby the anode 14 is formed.

After that, for example, the anode 14, the separator 15 impregnated with the electrolyte solution, and the cathode 12 are laminated, and they are contained in the package cup 13 and the package can 11, and the package cup 13 and the package can 11 are caulked. Thereby, the secondary battery shown in FIG. 1 is completed.

Thus, in the embodiment, the alloy or the compound including at least either tin or silicon further includes iron, so the cycle characteristics can be improved. More specifically, when the ratio of iron in the alloy or the compound is about 15% by mass or less, higher cycle characteristics can be obtained.

Moreover, when the alloy or the compound further includes less than about 1500 ppm by mass of chromium in addition to iron, the cycle characteristics can be further improved.

EXAMPLES

Next, specific examples of the invention will be described in detail below without limitation to the scope of the present invention.

Examples 1-1 Through 1-6

At first, a tin powder, a copper powder and an iron powder were mixed at mass fractions shown in Table 1 to form a mixture, and the mixture was melted, and was quenched through a melt spinning method to be solidified, thereby an alloy was formed. Next, after the formed alloy was gathered, and was pulverized in a mortar, the pulverized alloy with a size of about 100 μm or less was classified with a sieve, and the obtained powder was used as anode materials of Examples 1-1 through 1-6. When the size distribution of each of the anode materials of Examples 1-1 through 1-6 was determined, each of the anode materials of Examples 1-1 through 1-6 had a distribution from about 5 μm to about 100 μm, and the average particle size was approximately 30 μm.

TABLE 1

| | COMPOSITION OF ALLOY | | | CAPACITY RETENTION |
|---|---|---|---|---|
| | Sn (wt %) | Cu (wt %) | Fe (wt %) | RATIO (%) |
| EXAMPLE 1-1 | 60 | 39.9 | 0.1 | 76 |
| EXAMPLE 1-2 | 60 | 39.7 | 0.3 | 75 |
| EXAMPLE 1-3 | 60 | 37 | 3 | 75 |
| EXAMPLE 1-4 | 60 | 32 | 8 | 74 |
| EXAMPLE 1-5 | 60 | 30 | 10 | 72 |
| EXAMPLE 1-6 | 60 | 25 | 15 | 70 |
| COMPARATIVE EXAMPLE 1-1 | 60 | 40 | 0 | 68 |

Moreover, a coin type test cell shown in FIG. 1 was formed using each of the obtained anode materials of Examples 1-1 through 1-6. At first, 10 parts by mass of the obtained anode material, 10 parts by mass of artificial graphite as an anode active material and an electrical conductor, and 1 part by mass of polyvinylidene fluoride as a binder were mixed in N-methyl pyrrolidone as a dispersion medium to obtain anode slurry. Next, the anode slurry was applied to the anode current collector 14A made of copper foil with a bar coater, and N-methyl pyrrolidone was volatilized in an oven at 80° C. to form the anode mixture layer 14B. After that, the anode current collector 14A and the anode mixture layer 14B were stamped into a disk shape with a diameter of 15.0 mm to form the anode 14. Further, the mass of the anode mixture layer 14B in the anode 14 was approximately 50 mg.

Next, the cathode 12 made of lithium metal foil with a thickness of 1.0 mm was crimped onto the package can 11, and the separator 15 made of porous polypropylene and the anode 14 were placed thereon, and the electrolyte solution was injected into the package can 11, and the package can 11 and the package cup 13 were caulked by the gasket 16. As the electrolyte solution, a mixture including the same volumes of ethylene carbonate and dimethyl carbonate in which lithium hexafluorophosphate was dissolved at a concentration of 1 mol/l was used. The test cell had a diameter of 20 mm and a thickness of 1.6 mm.

Moreover, charge and discharge on the formed test cell of each of Examples 1-1 through 1-6 were repeated, and a ratio of a discharge capacity in the 10th cycle to a discharge capacity in the first cycle was calculated as a capacity retention ratio. The results are shown in Table 1. In this evaluation, a process of inserting lithium into the anode 14 so that the voltage of the test cell decreases is called "charge" and an inverse process is called "discharge". More specifically, charge and discharge were carried out through the following steps. At first, after charge was carried out at a constant current of 1 mA until the voltage of the test cell reached 0 mV, charge was carried out at a constant voltage until the current value declined to 0.05 mA, and then, discharge was carried out at a constant current of 1 mA until the voltage of the test cell reached to 1.5 V.

Moreover, as Comparative Example 1-1, an anode material was formed as in the case of Examples 1-1 through 1-6, except that a tin powder and a copper powder were mixed at mass fractions shown in Table 1, and no iron was included. When the size distribution of the anode material of Comparative Example 1-1 was determined, the anode material of Comparative Example 1-1 had a distribution from about 5 μm to about 100 μm, and the average particle size was approximately 32 μm. Further, a coin type test cell was formed using the anode material of Comparative Example 1-1 as in the case of Examples 1-1 through 1-6, and the capacity retention ratio thereof was calculated. The result is also shown in Table 1.

As shown in Table 1, in Examples 1-1 through 1-6, a higher capacity retention ratio could be obtained, compared to Comparative Example 1-1 in which no iron was included. In other words, it was found out that when the powder of an alloy including iron in addition to tin was used, cycle characteristics could be improved.

Moreover, there was a tendency that when the ratio of iron was increased, the rate of increasing the capacity retention ratio was reduced, and when the ratio of iron was about 8% by mass or less, a higher capacity retention ratio was obtained. In other words, it was found out that the ratio of iron was preferably about 15% by mass or less, more preferably about 10% by mass or less, and more preferably about 8% by mass or less.

Examples 2-1 and 2-2

As Examples 2-1 and 2-2, anode materials were formed as in the case of Examples 1-1 through 1-6, except that an alloy powder was formed through mixing a tin powder, a cobalt powder and an iron powder at mass fractions shown in Table 2, and performing mechanical alloying. Moreover, as Comparative Example 2-1 relative to Examples 2-1 and 2-2, an anode material was formed as in the case of Examples 2-1 and 2-2, except that a tin powder and a cobalt powder were mixed at mass fractions shown in Table 2, and no iron was included.

TABLE 2

|  | COMPOSITION OF ALLOY | | | CAPACITY RETENTION |
|---|---|---|---|---|
|  | Sn (wt %) | Co (wt %) | Fe (wt %) | RATIO (%) |
| EXAMPLE 2-1 | 60 | 35 | 5 | 70 |
| EXAMPLE 2-2 | 60 | 25 | 15 | 65 |
| COMPARATIVE EXAMPLE 2-1 | 60 | 40 | 0 | 61 |

When the size distributions of the anode materials of Examples 2-1 and 2-2 and Comparative Example 2-1 were determined, the anode materials had a distribution from about 1 μm to about 50 μm, and the average particle size was approximately 10 μm. Further, a coin type test cell was formed using each of the anode materials of Examples 2-1 and 2-2 and Comparative Example 2-1 as in the case of Examples 1-1 through 1-6, and the capacity retention ratio thereof was calculated. The results are shown in Table 2.

As shown in Table 2, in Examples 2-1 and 2-2, a higher capacity retention ratio could be obtained, compared to Comparative Example 2-1 in which no iron was included. In other words, it was found out that when cobalt was included instead of copper as an element other than tin and iron, superior cycle characteristics could be obtained.

Examples 3-1 through 3-5

Anode materials were formed as in the case of Examples 1-1 through 1-6, except that a tin powder, a copper powder, an iron powder and a chromium powder were mixed at mass fractions shown in Table 3. When the size distributions of the anode materials of Examples 3-1 through 3-5 were determined, the anode materials had a distribution from about 5 μm to about 100 μm, and the average particle size was approximately 30 μm. Further, a coin type test cell was formed using each of the anode material of Examples 3-1 through 3-5 as in the case of Examples 1-1 through 1-6, and the capacity retention ratio thereof was calculated. The results are shown in Table 3 together with the results of Example 1-3 and Comparative Example 1-1.

TABLE 3

|  | COMPOSITION OF ALLOY | | | | CAPACITY RETENTION |
|---|---|---|---|---|---|
|  | Sn (wt %) | Cu (wt %) | Fe (wt %) | Cr (wt ppm) | RATIO (%) |
| EXAMPLE 1-3 | 60 | 37 | 3 | 0 | 75 |
| EXAMPLE 3-1 | 60 | 36.999 | 3 | 10 | 77 |
| EXAMPLE 3-2 | 60 | 36.995 | 3 | 50 | 77 |
| EXAMPLE 3-3 | 60 | 36.95 | 3 | 500 | 78 |
| EXAMPLE 3-4 | 60 | 36.9 | 3 | 1000 | 75 |
| EXAMPLE 3-5 | 60 | 36.85 | 3 | 1500 | 74 |
| COMPARATIVE EXAMPLE 1-1 | 60 | 40 | 0 | 0 | 68 |

As shown in Table 3, in Examples 3-2 and 3-3 in which chromium was included at a ratio of 50 ppm by mass or 500 ppm by mass, a higher capacity retention ratio could be obtained, compared to Example 1-3 in which no chromium was included. On the other hand, in Example 3-5 in which chromium was included at a ratio of 1500 ppm by mass, the capacity retention ratio was lower than that in Example 1-3. In other words, it was found out that when an alloy powder including less than 1500 ppm by mass of chromium in addition to tin and iron was used, cycle characteristics could be further improved. Further, it was found out that the ratio of chromium was more preferably about 1000 ppm by mass or less, and more preferably about 10 ppm by mass or over.

Examples 4-1 and 4-2

As Examples 4-1 and 4-2 and Comparative Example 4-1, anode materials were formed as in the case of Examples 1-1 through 1-6, except that a silicon powder, a copper powder, an iron powder and a chromium powder were mixed at mass fractions shown in Table 4. When the size distributions of the anode materials of Examples 4-1 and 4-2 and Comparative Example 4-1 were determined, the anode materials had a distribution from about 5 μm to about 100 μm, and the average particle size was approximately 30 μm. Further, a coin type test cell was formed using each of the anode materials of Examples 4-1 and 4-2 and Comparative Example 4-1 as in the case of Examples 1-1 through 1-6, and the capacity retention ratio thereof was calculated. The results are shown in Table 4.

TABLE 4

|  | COMPOSITION OF ALLOY | | | | CAPACITY RETENTION |
|---|---|---|---|---|---|
|  | Si (wt %) | Cu (wt %) | Fe (wt %) | Cr (wt ppm) | RATIO (%) |
| EXAMPLE 4-1 | 50 | 45 | 5 | 0 | 30 |
| EXAMPLE 4-2 | 50 | 44.93 | 5 | 700 | 32 |
| COMPARATIVE EXAMPLE 4-1 | 50 | 50 | 0 | 0 | 20 |

As shown in Table 4, in Examples 4-1 and 4-2, a higher capacity retention ratio could be obtained, compared to Comparative Example 4-1 in which iron and chromium were not included. Moreover, it was evident from a comparison between Examples 4-1 and 4-2 that in Example 4-2 in which chromium was included, a higher capacity retention ratio could be obtained, compared to Example 4-1. In other words, it was found out that when a silicon alloy included iron as in the case of a tin alloy, cycle characteristics could be improved, and when the silicon alloy included chromium in addition to iron, cycle characteristics could be further improved.

Although the present invention is described referring to the embodiment and examples, the invention is not specifically limited to them, and is variously modified. For example, in the embodiment and the examples, the electrolyte solution which is a liquid electrolyte is used; however, any other electrolyte may be used instead of the electrolyte solution. Examples of the electrolyte include a gel electrolyte in which a high molecular weight compound holds an electrolyte solution, a solid electrolyte having ionic conductivity, a mixture of the solid electrolyte and the electrolyte solution, or a mixture of the solid electrolyte and the gel electrolyte.

As the gel electrolyte, various high molecular weight compounds which absorb the electrolyte solution to be gelatinized can be used. Examples of such high molecular weight compounds include a fluorine-based high molecular weight compound such as polyvinylidene fluoride, or a copolymer of vinylidene fluoride and hexafluoropropylene, an ether-based high molecular weight compound such as polyethylene oxide or a cross-link including polyethylene oxide, and polyacrylonitrile. More specifically, in terms of stability of oxidation-reduction, the flurorine-based high molecular weight compound is preferable.

As the solid electrolyte, for example, a solid high molecular weight electrolyte in which an electrolyte salt is dispersed in a high molecular weight compound having ionic conductivity, or an inorganic solid electrolyte made of ion conducting glass, ionic crystal or the like can be used. As the high molecular weight compound of the solid high molecular weight electrolyte, for example, an ether-based high molecular weight compound such as polyethylene oxide or a crosslink including polyethylene oxide, a ester-based high molecular weight compound such as polymethacrylate, an acrylate-based high molecular weight compound, a mixture thereof, or a copolymer thereof can be used. Further, as the inorganic solid electrolyte, lithium nitride, lithium iodide or the like can be used.

Moreover, in the embodiment and the examples, the invention is described referring to the coin type secondary battery. However, the invention is also applicable to secondary batteries with any other shape such as a cylindrical shape, a button shape or a prismatic shape, secondary batteries using a package member such as a laminate film or secondary batteries with any other structure such as a winding structure in a like manner. Further, in the embodiment and the examples, the case where the invention is applied to the secondary batteries is described; however, the invention is applicable to any other batteries such as primary batteries in a like manner.

Further, in the above-described embodiment and the examples, lithium is used as an electrode reactive species; however, the invention is applicable to the case where any other Group 1 element in the long form of the periodic table of the elements such as sodium (Na) or potassium (K), a Group 2 element in the long form of the periodic table of the elements such as magnesium or calcium (Ca), any other light metal such as aluminum, lithium, or an alloy thereof is used, thereby the same effects can be obtained. In this case, a battery can be formed as in the case of the embodiment, except that the cathode active material, the electrolyte salt and so on are selected depending upon the light metal.

As described above, in the anode material according to the invention and the battery according to the invention, an alloy or a compound including at least either tin or silicon further includes iron, so the cycle characteristics can be improved.

More specifically, when the ratio of iron in the alloy or the compound is 15% by mass or less, or when chromium is further included at a ratio of less than 1500 ppm by mass, the cycle characteristics can be further improved.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An anode material, comprising:
   an alloy or a compound including iron and chromium in addition to at least one element selected from the group consisting of tin and silicon, wherein the chromium is present in an amount of from about 50 ppm by mass or more to about 500 ppm by mass or less.
2. The anode material according to claim 1, wherein
   the iron is included in an amount of from about 0.1% by mass or more to about 15% by mass or less.
3. The anode material according to claim 2, wherein
   the iron is included in an amount of from about 10% by mass or less.
4. The anode material according to claim 3 wherein
   the iron is included in an amount of from about 8% by mass or less.
5. The anode material according to claim 1, wherein the anode material includes a powder of the alloy or the compound.
6. The anode material according to claim 5, wherein the powder of the alloy or compound has an average particle size of about 10 μm to about 30 μm.
7. The anode material according to claim 1, wherein
   the alloy or compound further comprises an element selected from the group consisting of cobalt and copper.
8. A battery, comprising:
   a cathode;
   an anode; and
   an electrolyte,
   wherein the anode comprises an anode material, and the anode material comprises an alloy or a compound including iron and chromium in addition to at least one element selected from the group consisting of tin and silicon, and wherein the chromium is present in an amount of from about 50 ppm by mass or more to about 500 ppm by mass or less.
9. The anode material according to claim 8, wherein
   the iron is included in an amount of from about 0.1% by mass or more to about 15% by mass or less.
10. The anode material according to claim 9, wherein
    the iron is included in an amount of from about 10% by mass or less.
11. The anode material according to claim 10 wherein
    the iron is included in an amount of from about 8% by mass or less.
12. The anode material according to claim 8, wherein
    the anode material includes a powder of the alloy or the compound.
13. The anode material according to claim 12, wherein
    the powder of the alloy or compound has an average particle size of about 10 μm to about 30 μm.
14. The anode material according to claim 8, wherein
    the alloy or compound further comprise an element selected from the group consisting of cobalt and copper.
15. An anode material, comprising:
    an alloy or a compound consisting essentially of iron, chromium, and at least one element selected from the group consisting of tin and silicon, wherein the chromium is present in an amount of less than about 1500 ppm by mass.
16. The anode material according to claim 15 wherein the iron is included in an amount of from about 8% by mass or less.
17. The anode material according to claim 15, wherein the chromium is present in an amount of from about 50 ppm by mass or more to about 500 ppm by mass or less.
18. An anode material, comprising:
    an alloy or a compound consisting essentially of
       iron, chromium,
          an element selected from the group consisting of cobalt and copper, and
          at least one element selected from the group consisting of tin and silicon,
    wherein the chromium is present in an amount of less than about 1500 ppm by mass.

19. A battery, comprising:
a cathode;
an anode; and
an electrolyte,
wherein the anode comprises an anode material, and the anode material comprises an alloy or a compound consisting essentially of iron, chromium, and at least one element selected from the group consisting of tin and silicon, and the chromium is present in an amount of less than about 1500 ppm by mass.

20. The anode material according to claim 19 wherein the iron is included in an amount of from about 8% by mass or less.

21. The anode material according to claim 19, wherein the chromium is present in an amount of from about 50 ppm by mass or more to about 500 ppm by mass or less.

22. A battery, comprising:
a cathode;
an anode; and
an electrolyte,
wherein the anode comprises an anode material, and the anode material comprises an alloy or a compound consisting essentially of
iron, chromium,
at least one element selected from the group consisting of tin and silicon, and
an element selected from the group consisting of cobalt and copper, and
wherein the chromium is present in an amount of less than about 1500 ppm by mass.

* * * * *